United States Patent [19]

Bley

[11] Patent Number: 4,794,784
[45] Date of Patent: Jan. 3, 1989

[54] LEAK DETECTOR CALIBRATING DEVICE

[75] Inventor: Werner G. Bley, Bonn, Fed. Rep. of Germany

[73] Assignee: Leybold-Heraeus GmbH, Cologne, Fed. Rep. of Germany

[21] Appl. No.: 41,416

[22] Filed: Apr. 23, 1987

[30] Foreign Application Priority Data

Apr. 23, 1986 [DE] Fed. Rep. of Germany ....... 3613694

[51] Int. Cl.$^4$ ...................... G01M 3/02; G01D 18/00
[52] U.S. Cl. .......................................... 73/1 G; 73/40
[58] Field of Search ........................... 73/1 G, 1 R, 40

[56] References Cited

U.S. PATENT DOCUMENTS 4,328,700  5/1982  Fries ................................. 73/1 G X
4,343,176  8/1982  Basford et al. ....................... 73/1 G

FOREIGN PATENT DOCUMENTS 2427905  1/1976  Fed. Rep. of Germany .
3243752  5/1984  Fed. Rep. of Germany .
3147030  8/1985  Fed. Rep. of Germany .
 144821 11/1980  German Democratic Rep. .
 364152 10/1962  Switzerland .

OTHER PUBLICATIONS

Baryshnikova et al., "A Leak Simulator for Calibrating Helium Leak Detectors During Tests by the Probe Method", *Instruments & Experimental Techniques*, vol. 16, No. 6, pt. 2, pp. 1763-1764.

Primary Examiner—Tom Noland
Attorney, Agent, or Firm—Spencer & Frank

[57] ABSTRACT

A leak detecting apparatus includes a detector arranged for sensing a gas emanating through a specimen to be tested for leaks; a leak simulator having an outlet emitting a gas of a known flow rate; and a valve for selectively connecting the outlet to the detector during a calibration thereof and disconnecting the outlet from the detector during a leak detecting operation thereof. The valve comprises a fast-switching 3/2-way valve including a movable valve member having first and second positions. In the first position the movable valve member allows communication through the valve solely between the outlet of the leak simulator and an input of the detector and in the second position allows communication through the valve solely between the outlet of the leak simulator and the atmosphere.

6 Claims, 2 Drawing Sheets

LEAK DETECTOR CALIBRATING DEVICE

BACKGROUND OF THE INVENTION

This invention relates to a device for calibrating the detector of a leak searching apparatus. The device has a leak simulator and a valve situated between the leak simulator and the detector.

Contemporary leak detectors which work with helium as the test gas are capable of detecting helium leakage rates of less than $10^{-10}$ mbar l/sec. With the aid of the leak simulator—which preferably has its own gas reservoir—there is effected a verification and/or alignment (adjustment) of the leak detector. Leak simulators simulate a leak with a known leakage rate. It is therefore generally required of leak simulators that they deliver stable test gas flow over long periods. Further, the test gas flow should be available as soon as possible upon the beginning of a calibrating process without any affections by unwanted gas sources.

The calibrating of a helium leak detector is performed by comparing the known leakage rate of the leak simulator with the indications of the leak detector. From the two values either a correctional factor is formed or the indication is set to the correct value by means of an appropriate setting element.

Leak simulators may be generally divided into two groups. To the first group there belong leak simulators with leakage rates that are greater than $10^{-6}$ mbar l/sec. These have a relatively high test gas consumption which—in case of continuously leaking test gas—would lead relatively early to pressure changes which, in turn, alter the leakage rate of the leak simulator, so that it may no longer be used for calibrating purposes. It is therefore known to equip leak simulators of this type (that is, for leakage rates greater than $10^{-6}$ mbar l/sec) with a shutoff valve as described in German Offenlegungsschrift (non-examined published application) No. 3,243,752. When the leak simulator is not operating, the shutoff valve is closed.

To the second group there belong leak simulators which deliver leakage rates of less than $10^{-6}$ mbar l/sec, and thus are adapted for calibrating highly sensitive leak detectors. Because of the very small leakage rates, such a leak simulator is capable of continuously delivering an approximately constant gas flow for years from a relatively small gas reservoir. Leak simulators of this type therefore have no shutoff valves. If, however, a need to interrupt the test gas flow is anticipated, a leak simulator of this type also has to be equipped with a shutoff valve. Such a need exists, for example, in case of a leak simulator incorporated in a highly sensitive leak detector, in order to initiate a calibrating process a any time even when the specimen to be tested for leaks is attached or during the performance of automatic processes.

When a shutoff valve is used with a leak simulator, the following disadvantages are unavoidable:

Since the shutoff valve often has to remain closed for very long periods between two calibrating processes, test gas accumulates in the space (dead space) in front of the closed shutoff element. Due to such an accumulation, after opening the shutoff valve, first a "test gas surge" occurs which is of such a magnitude and whose concentration is so high that there is a danger of a contamination and/or over-regulation of the recording apparatus, such as a test gas-sensitive mass spectrometer-detector. Further, the shutoff element can be in the closed position of the valve, exposed to the full test gas pressure (which amounts to a few bars). As a result, the test gas is enriched in the closing element, particularly in the sealing materials. If then the valve is opened for initiating a calibrating process, the embedded gas particles escape (drift) from the closing mechanism and falsify the leakage flow proper of the leak simulator for a relatively long period. In case the closing element is a rubber or synthetic diaphragm, the mentioned drift phenomena appear in a particularly pronounced manner. Further, in the closed position of the valve—thus, during the leak detecting operation—a permeation through the diaphragm is unavoidable. If the leak simulator is installed in a leak detector, the gas particles penetrating through the diaphragm enter in the test gas-sensitive detector.

In the leak simulator which is described in German Offenlegungsschrift No. 3,243,752 and which belongs to the first group of leak simulators, that is, it delivers a leak rate of greater than $10^{-6}$ mbar l/sec, a dead space in front of the shutoff mechanism of the shutoff valve is almost nonexistent. The disadvantageous phenomena such as test gas surge, drift and permeation are therefore suppressed to such an extent that they are negligible as compared to the desired leak rate and consequently they do not distort the calibration.

A shutoff valve according to German Offenlegungsschrift No. 3,243,752 is, however, not usable with a leak simulator belonging to the second group, that is, which has leak rates of less than $10^{-6}$ mbar l/sec, because gas streams which appear by virtue of the disadvantageous phenomena, such as test gas surge, drift and permeation, are not negligible as compared to the desired leak rates. In order to avoid distortions of this nature, it is known to utilize a "pumped" leak simulator as a closable leak simulator for small leak rates. The outlet of such a leak simulator is, by means of a branch conduit and a valve disposed therein, continuously connected with the inlet of the leak detector in which it is incorporated. The branch conduit merges into the main conduit which is connected with the specimen to be tested for leaks and is equipped with a valve as well. During normal operation the valve in the branch conduit is closed whereas the valve in the main conduit is open. In a device of this type it is necessary to attach, with the aid o a further valve, a separate vacuum pump to the chamber between the outlet of the leak simulator and the first-noted valve for continuously removing the test gas emanating from the leak simulator. Without evacuation the space would fill with test gas in high concentration and thus could not be connected immediately with the detector to be calibrated. With the high test gas concentration which leads to an undesired "test gas surge" there is coupled the danger of a contamination and/or over-regulation of the mass spectrometer detector. Also, the above-described drift phenomena would appear as well. For the calibrating process the valve associated with the separate vacuum pump is closed and the valve to the leak detector is opened.

A "pumped" leak simulator involves substantial expense: in the first place, as noted, a separate vacuum pump is needed. Conventionally, for this purpose an auxiliary pump serving for tough-evacuation is being used. The vacuum pumps utilized for providing a vacuum for the mass spectrometer cannot be utilized because the removed helium diffuses back through these pumps and would thus falsify the indications of the leak detector. Portable leak detectors, because of the weight of a separate (additional) vacuum pump cannot be equipped with a "pumped" leak simulator. Such "pumped" leak simulators therefore can find application only in large installations where either costs and weight problems are not primary considerations or which have further vacuum pumps adapted to assume the pumping function for the leak simulator.

SUMMARY OF THE INVENTION

It is an object of the invention to provide an improved apparatus for calibrating a leak detector in which an undesired test gas surge and drift phenomena may b avoided without the need for resorting to a separate vacuum pump.

This object and others to become apparent as the specification progresses, are accomplished by the invention, according to which, briefly stated, the valve situated between the leak simulator and the detector is a rapidly switching 3/2-way valve which connects the leak simulator either with the atmosphere (during detecting operation) or with the input of the detector to be calibrated (during calibrating operation).

According to a further feature of the invention, the output of the leak simulator and the 3/2-way valve are in a close vicinity to one another. In this manner, the space between the flow-rate determining restriction of the leak simulator and the valve is maintained small so that an excessively high pressure increase after switch over from the detecting operation to the calibrating operation is avoided. In case of a sufficiently small space and a sufficiently rapidly switching valve a switchover from the detecting operation to the calibrating operation may be effected without delay. "Rapidly switching" in the present context means that the pressure increase caused by the switchover operation remains without effect on the detector to be calibrated. The desired leak rate of the leak simulator is available immediately after the switchover without distortion.

In case the leak simulator and the valve are not situated next to each other and/or the 3/2-way valve does not switch rapidly enough, with the detector an additional valve is associated which protects the detector from a short-term harmful pressure increase. The period which is necessary to pump away the "air surge" lasts no longer than a few seconds. Immediately thereafter the desired leak rate of the leak simulator is available. Drift phenomena or permeation do not occur.

The particular advantage of the apparatus according to the invention resides in that it is adapted for an automated (for example, a microprocessor-controlled) operation. The leak simulator may be opened and closed by electric control via the 3/2-way valve. The leak simulator may be separated from the detector for an arbitrarily long period without the appearance of deviations from the desired leak rate value immediately after opening the valve. As compared to a "pumped" leak simulator, the device according to the invention is significantly simpler because it does not need a separate vacuum pump. The entire apparatus is compact and lightweight and may be incorporated into a portable leak detector without difficulties. It is a further advantage of the invention that leak detectors may be easily retrofitted with the device according to the invention.

DESCRIPTION OF THE PREFERRED EMBODIMENT

Figure 1:
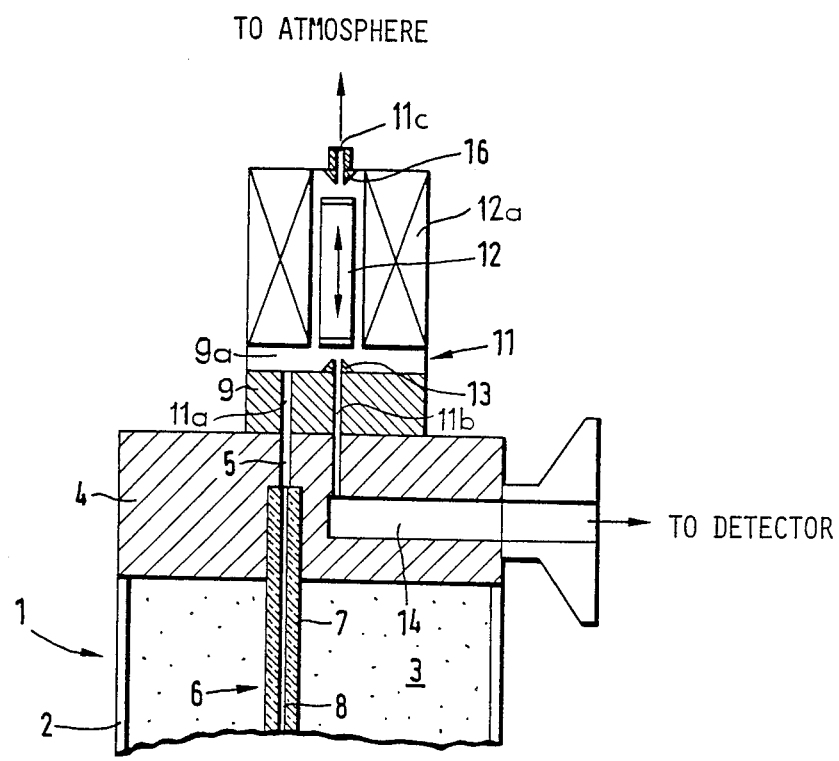
FIG. 1 is a sectional schematic side elevational view of a preferred embodiment of the invention.

Turning now to FIG. 1, the leak simulator generally designated at 1 is only fragmentarily shown. It has a housing 2 defining a helium reservoir 3. The housing 2 is closed with a top closure 4 which has a channel 5 for guiding the helium emanating from the reservoir 3. A leakage rate determining component 6 secured in the closure 4 and communicating with the channel 5 has a cylindrical glass body 7 provided with a central capillary channel 8. The leak determining element may also be a diffusion finger, a diaphragm or the like.

On the closure 4 there is mounted a 3/2-way valve 11 having a housing 9. A valve port 11a provided in the housing 9 directly connects the channel 5 with the control chamber 9a of the valve 11. The valve 11 further has a reciprocating valve plunger (valve head) 12, constituting a movable core (armature) of a valve-actuating solenoid 12a. The plunger 12 which is shown in an intermediate (transient) position in FIG. 1, may be rapidly switchable from one end position to another. In one of its end positions (detector operation), the plunger 12 sealingly engages a seat 13 of a valve port 11b and thus closes off a conduit 14 leading to the leak detector (not shown in FIG. 1). In this position a valve port 11c which has a seat 16 and which leads to the atmosphere is open and thus the helium continuously exiting from the leak rate determining device 6 is released into the atmosphere. Thus, high test gas pressures or concentrations may not appear in the chamber 9a.

In its other end position the valve plunger 12 sealingly engages the seat 16 of the valve 11 and thus closes off the valve port 11c leading to the atmosphere while, at the same time, by having lifted off the seat 13, it causes communications to be established between the leak simulator 1 and the leak detector via the valve port 11b and the conduit 14. Thus, immediately upon a switchover of the valve plunger 12 to this end position, the helium exiting from the device 6 with known leak rate is available for calibrating purposes. If the inner space (valve chamber 9a) of the housing is sufficiently small and the switchover of the valve plunger 12 is sufficiently rapid, an air surge which would endanger the results of the detector calibration does not appear.

Figure 2:
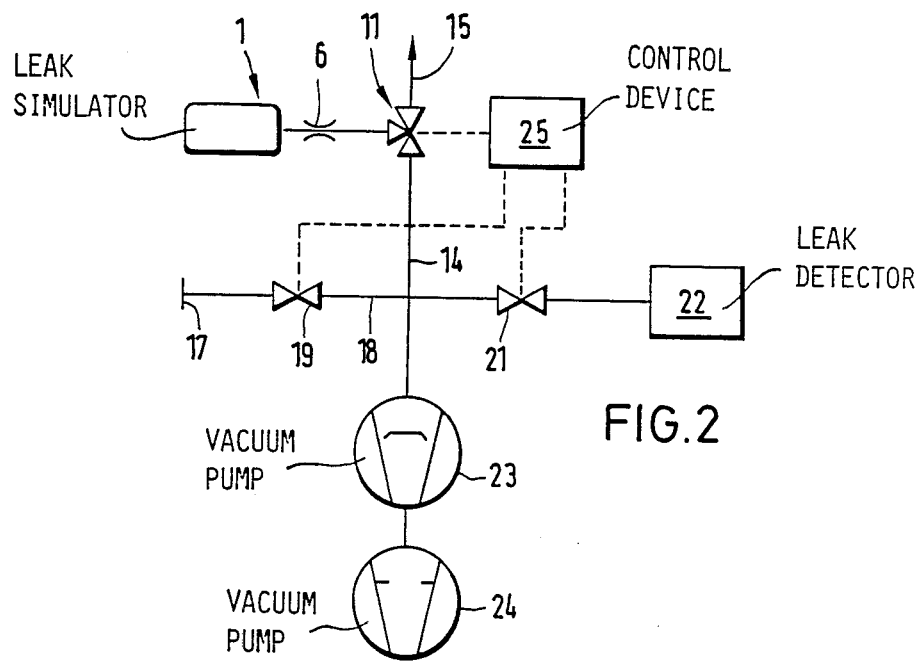
FIGS. 2 and 3 are block diagrams of two examples of using the invention.

Turning now to FIG. 2 there is illustrated a block diagram of a main flow leak detector. The coupling for the specimen (equipment) to be examined for leaks is designated at 17. The coupling 17 is connected with an input of a test gas detector 22, preferably a mass spectrometer, by means of the main conduit 18 with the intermediary of valves 19 and 21. The device according to the invention, that is, the leak simulator 1 equipped with the 3/2-way valve 11 is coupled by the conduit 14 to the conduit 18 between the valves 19 and 21 and to a pump set formed of a high vacuum pump 23, such as a diffusion pump and a fore-vacuum pump 24. A control device 25 is connected to the solenoid 12a of the 3/2-way valve 11 and the valves 19 and 21.

During the leak detecting operation the valves 19 and 21 are open so that the test gas passing through a leak in the specimen may reach the detector 22. The leak simulator 1 is connected with the atmosphere by means of the 3/2-way valve 11 and the conduit 15. The switchover from the leak detecting operation to the test run (calibrating operation) is effected by closing the valve 19 and switching the 3/2-way valve 11 in such a manner that the leak simulator 1 is connected by means of the conduit 14 and the main conduit 18 with the detector 22. In case the valve 11 does not switch sufficiently fast, the valve 21 is closed before switchover to test run and is maintained closed after the switchover for a short period in order to permit any air surge which would endanger the detector 22, to be drawn away by the pumps 23 and 24. Immediately thereafter the leakage rate of the leak simulator 1 is available without distortion.

Figure 3:
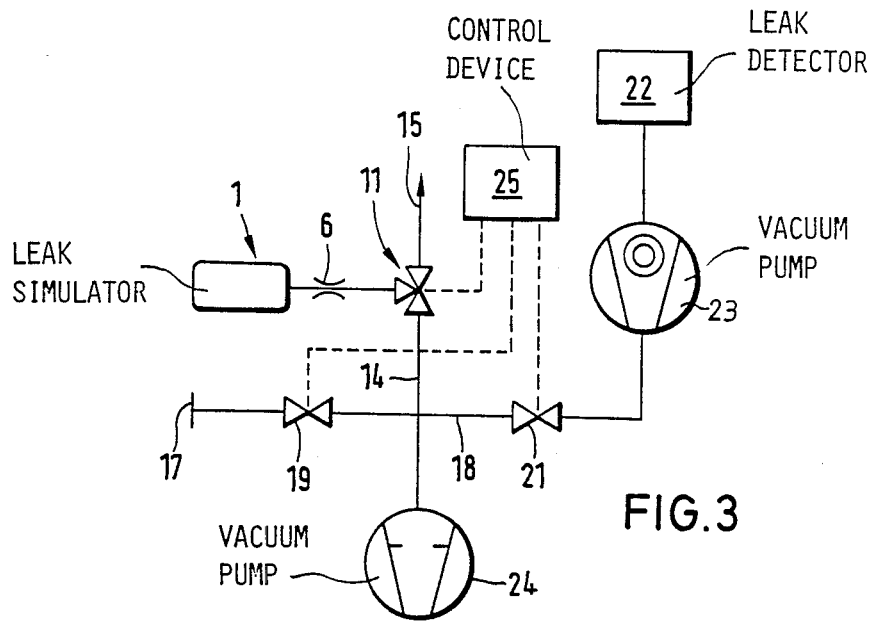

FIG. 3 is a block diagram of a counterflow leak detector. The high vacuum pump 23 which may be a turbomolecular vacuum pump, is connected in the conduit 18 and immediately adjoins the mass spectrometer-type detector 22. During the leak detecting operation the valves 19 and 21 are open. The 3/2-way valve 11 connects the output of the leak simulator 1 with the atmosphere. The switchover to test run is effected in a manner described in connection with FIG. 1.

The present disclosure relates to subject matter contained in Federal Republic of Germany patent application No. P 36 13 694.8 (filed Apr. 23rd, 1986) which is incorporated herein by reference.

It will be understood that the above description of the present invention is susceptible to various modifications, changes and adaptations, and the same are intended to be comprehended within the meaning and rang of equivalents of the appended claims.

What is claimed is:

1. In a leak detecting apparatus including a detector arranged for sensing a gas emanating through a specimen to be tested for leaks; a leak simulator having an outlet emitting a gas of a known flow rate; and valve means for selectively connecting said outlet to said detector during a calibration thereof and disconnecting said outlet from said detector during a leak detecting operation thereof; the improvement wherein said valve means comprises a fast-switching 3/2-way valve including (a) a first valve port connected to the atmosphere;
(b) a second valve port connected to said detector;
(c) third valve port connected to said outlet of said leak simulator;
(d) a movable valve member having first and second positions; in said first position said movable valve member allowing communication through the valve solely between said second and third valve ports to operatively connect the outlet of said leak simulator with said detector and in said second position allowing communication through said valve solely between said first and third valve ports to connect the outlet of said leak simulator with the atmosphere; and
(e) means for moving said movable valve member into said first or second position.

2. A leak detecting apparatus as defined in claim 1, wherein said means for moving said movable valve member comprises a solenoid and said movable valve member is an armature movable by magnetic forces generated by said solenoid.

3. A leak detecting apparatus as defined in claim 1, further comprising a first valve seat surrounding said first valve port and a second valve seat surrounding said second valve port; said movable valve member being seated in said first valve seat and sealingly obturating said first valve port in said first position and said movable valve member being seated in said second valve seat and sealingly obturating said second valve port in said second position.

4. A leak detecting apparatus as defined in claim 1, wherein said outlet of said leak simulator and said 3/2-way valve are located in an immediate vicinity to one another.

5. A leak detecting apparatus as defined in claim 1, further comprising an additional valve situated between said second valve port and said detector for allowing or preventing communication between said second port and said detector.

6. In a leak detecting apparatus including a detector arranged for sensing a gas emanating through a specimen to be tested for leaks; a leak simulator having an outlet emitting a gas of a known flow rate; and valve means for selectively connecting said outlet to said detector during a calibration thereof and disconnecting said outlet from said detector during a leak detecting operation thereof; the improvement wherein said valve means comprises a fast-switching 3/2-way valve including a movable valve member having first and second positions; in said first position said movable valve member allowing communication through the valve solely between the outlet of said leak simulator and an input of said detector and in said second position allowing communication through said valve solely between the outlet of said leak simulator and the atmosphere.

* * * * *

UNITED STATES PATENT AND TRADEMARK OFFICE
CERTIFICATE OF CORRECTION

PATENT NO. : 4,794,784

DATED : January 3rd, 1989

INVENTOR(S) : Werner GROSSE BLEY

It is certified that error appears in the above-identified patent and that said Letters Patent is hereby corrected as shown below:

In the heading of the patent, under [75] the inventor's name should read --Werner Grosse Bley--.

Item [19], "Bley" should read -- Grosse Bley --.

Signed and Sealed this

Twenty-third Day of May, 1989

Attest:

DONALD J. QUIGG

*Attesting Officer*  *Commissioner of Patents and Trademarks*